Dec. 16, 1930.  A. SCHNABEL  1,784,976
BABY CARRIAGE OR THE LIKE
Filed July 20, 1928
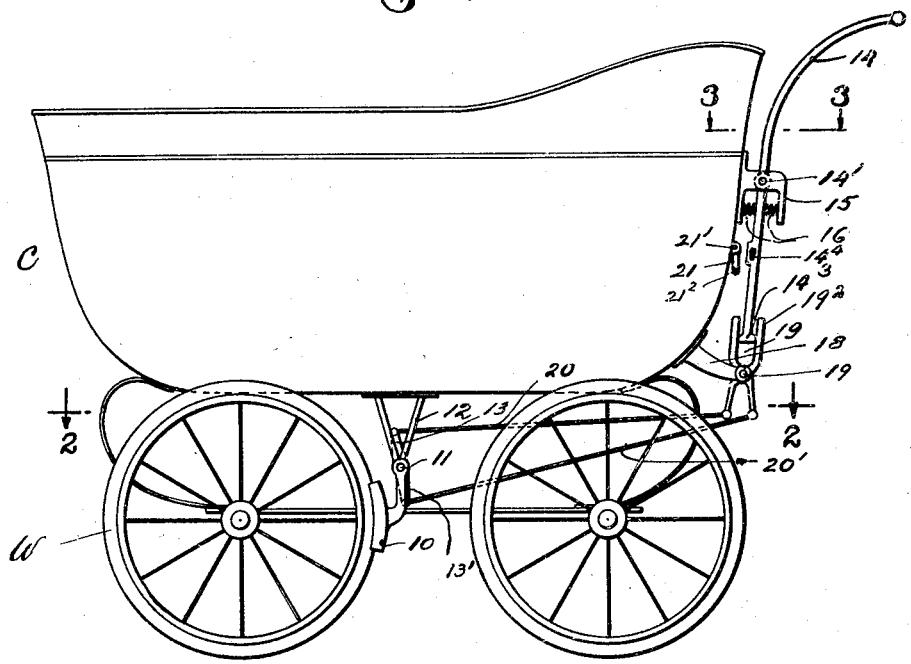
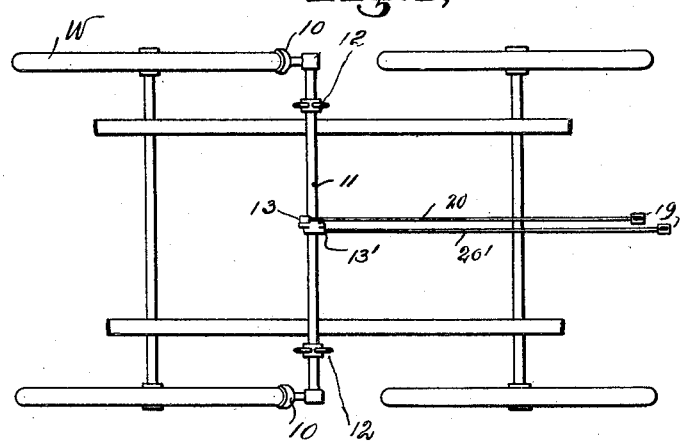
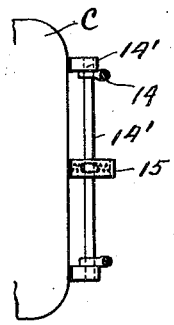
INVENTOR.
Alfred Schnabel
BY
ATTORNEYS.

Patented Dec. 16, 1930

1,784,976

UNITED STATES PATENT OFFICE

ALFRED SCHNABEL, OF NEW YORK, N. Y.

BABY CARRIAGE OR THE LIKE

Application filed July 20, 1928. Serial No. 294,102.

This invention relates to brakes for baby carriages, push cars or other vehicles and has for its principal object to provide a brake which will be simple and inexpensive and which will be automatically operated when the vehicle is at rest.

Another object is to provide a movable handle for the vehicle and means intervening between said handle and the brake mechanism whereby when the handle is pushed or pulled to propel the vehicle the brake will be released.

With these and other objects in view my invention substantially consists in the novel construction, combination and arrangement of parts as will be hereinafter more fully described and defined in the appended claims.

One embodiment of my invention is illustrated in the accompanying drawing which constitutes part of this specification and in which similar reference characters denote corresponding parts, Fig. 1 being a side elevation of a baby carriage equipped with my automatic brake; Fig. 2 a section on line 2—2 of Fig. 1 and Fig. 3 a section on line 3—3 of Fig. 1.

Referring in detail to the drawing, C denotes a baby carriage or the like of the usual construction and W the wheels thereof. 10 denote the usual brake shoes adapted to cooperate with the front wheels W. These brake shoes, according to the present embodiment are fixed to the ends of a horizontal or transversal spindle 11 which is rotatively supported in brackets 12 secured to and projecting downwardly from the bottom of the vehicle. Fixed about centrally on the spindle 11 are two oppositely directed arms 13 and 13' for the manipulation of the brakes, as will be hereinafter more fully described.

14 denotes a suitable handle bar for wheeling the carriage. This handle is pivoted at 14' in a bracket 15 projecting from the rear end wall of the carriage and in which are mounted two springs 16 acting from two opposite sides with equal force against the part of the handle extending below its fulcrum, thereby tending to retain the handle in normal position. Projecting from the lower part of the rear wall of the carriage is another bracket 18 in which are fulcrumed at 19' a pair of forceps like members 19. The lower end of the handle engages between the upper ends or forks $19^2$ of the members 19 and has a rounded or cam shaped portion $14^3$ which is adapted to be constantly bearing against both said forks, so that when the handle 14 is swung on its pivot 14' either forwardly or rearwardly it will swing the corresponding finger or fork $19^2$ in the opposite direction. The lower parts of the fingers or forks $19^2$ are connected by rods 20 and 20' to the aforenamed arms 13 and 13' respectively, as a result of which the brake shoes 10 will be swung away from the wheels W when either one of said arms 13 and 13' is operated through the moving of the handle bar 14 from its normal position either forwardly or rearwardly.

The mode of operation is as follows:

When the handle bar of the baby carriage is released, it will occupy the normal position shown in Fig. 1 in which it will be held by the springs 16. In this position the brake shoes will be applied to the wheels and may be held in operative position by springs (not shown). Whenever the handle bar is pushed forwardly or pulled rearwardly the handle will yield in the corresponding direction tilting slightly on its pivot 14', as a result of which the corresponding fork or finger $19^2$ of the forceps like levers 19 will be turned on its pivot 19' and through the corresponding rod 20 and 20' swing the corresponding arm 13 and 13', thereby removing the brake shoes from the operative position.

The automatic action of the brake may, if desired, be cut out, as when the carriage is wheeled on a slight down grade or perfectly smooth surface, where hardly any force is necessary to propel the vehicle. To this end a lock or catch 21 is provided, in form of an arm pivoted as at 21' to the rear wall of the carriage and formed with a beaded head $21^2$ or the like. Opposite said arm the lower part of the handle bar is provided with a keyhole shaped recess $14^4$ capable of engaging the bead or head of said arm and thereby lock said handle bar out of its normal position, i. e. inclined either forwardly or rearwardly so that the brakes will be in inoperative position.

While I have described in the foregoing one form of construction of my device it is clear that various modifications may be made in the construction without departing from the principle of my invention and I therefore, do not wish to restrict myself to the details described and shown.

What I claim is:

1. In a baby carriage or the like, brakes adapted to be normally in operative position, a handle bar pivotally supported on said carriage and means for releasing said brakes by the movement of said handle including oppositely moving elements engaged by said handle bar.

2. In a baby carriage or the like, brakes adapted to normally occupy the braking position, a handle bar pivoted to the carriage, springs adapted to hold said handle in neutral position, a pair of elements swinging in opposite directions and engaging the lower end of said handle bar and means connecting said elements with said brakes so that when the handle bar is swung out of its normal position the brakes will be released.

3. In a baby carriage or the like, braking shoes tending to normally occupy the operative position, a handle bar pivoted to the carriage, springs tending to hold said handle bar in neutral position, a pair of forceps like elements pivoted to the carriage and engaging between the lower end of said handle bar, a pair of oppositely directed arms operatively connected to each brake shoe, and connecting means between said arms and said forceps like elements, whereby when said handle bar is moved out of its neutral position the brake shoes will be released.

4. A baby carriage or the like, as per claim 3 in which means are provided to lock said handle bar out of its neutral position in order to hold the brakes released.

5. In a baby carriage or the like, brakes adapted to be normally in operative position, a handle bar supported on said carriage and means for releasing said brakes, including means on said handle bar and oppositely movable elements engaged by said last named means.

In testimony whereof I affix my signature.

ALFRED SCHNABEL.